Sept. 1, 1953  F. A. MORGAN  2,650,659
NUT ACTUATED SPIDER TYPE TIRE BEAD LOOSENER
Filed Sept. 27, 1951  2 Sheets-Sheet 1
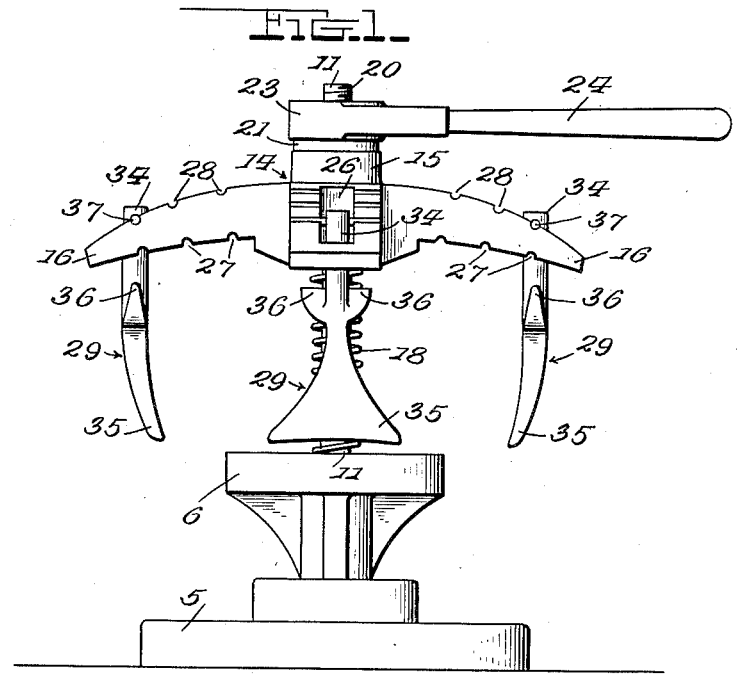
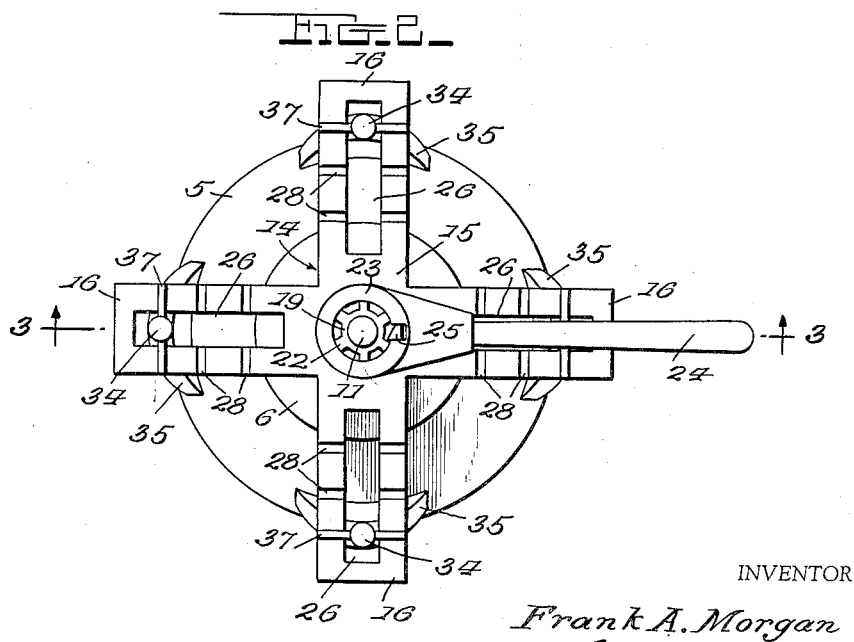
INVENTOR
Frank A. Morgan
BY
ATTORNEY.

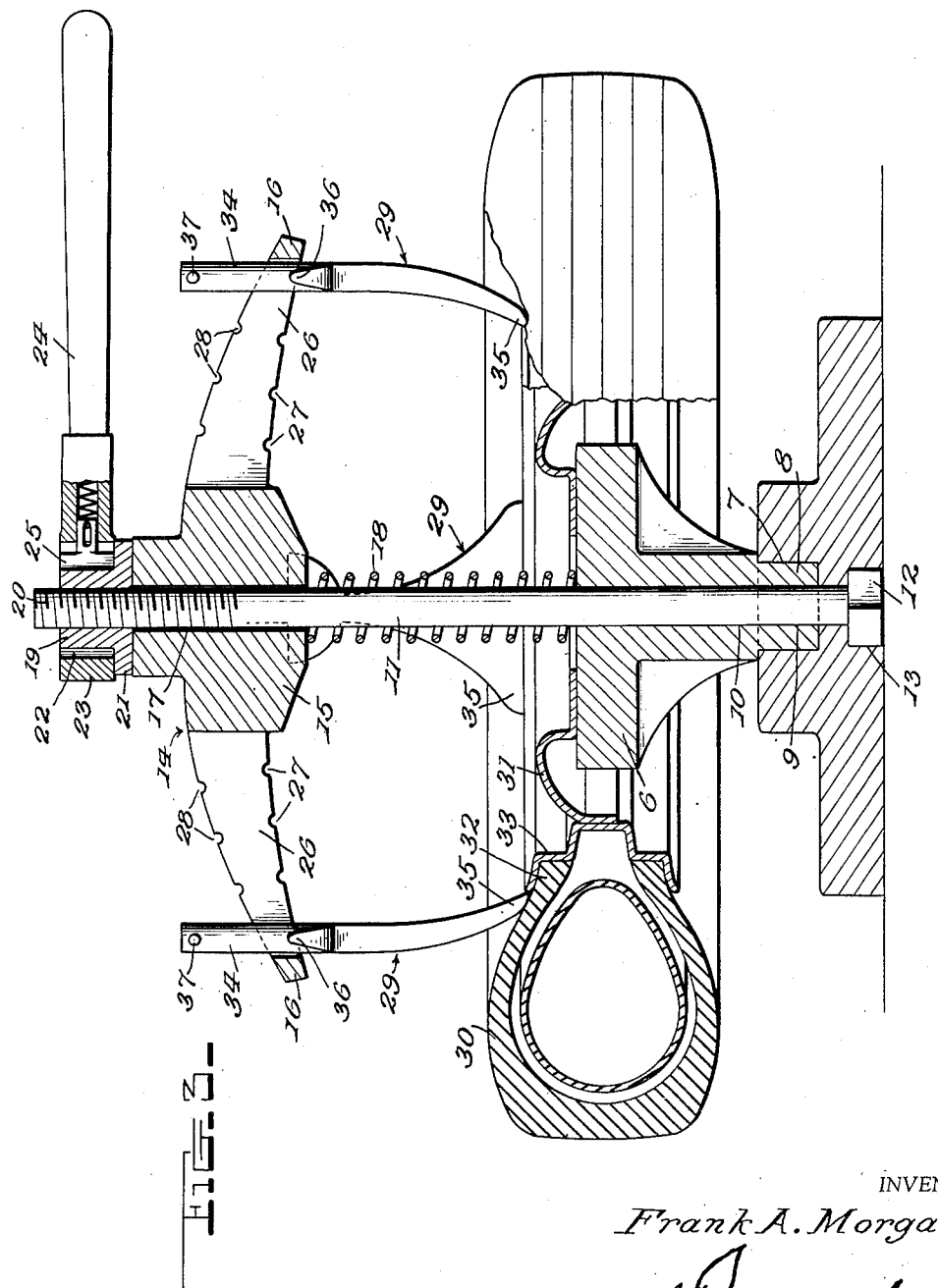

Patented Sept. 1, 1953

2,650,659

UNITED STATES PATENT OFFICE 2,650,659

NUT ACTUATED SPIDER TYPE TIRE BEAD LOOSENER

Frank A. Morgan, Anderson, Ind.

Application September 27, 1951, Serial No. 248,541

2 Claims. (Cl. 157—1.2)

This invention relates to certain new and useful improvements in nut actuated spider type tire bead looseners.

When removing tires from wheels, it is usually found that the tire beads have become so tightly stuck to the rim that they must be forcibly broken loose. To accomplish this, the wheel and tire are usually laid upon the ground or floor and the service station attendant or garage workman stands on the tire and with his heels attempts to break the uppermost bead loose. If this fails, the chances are that he will beat upon the tire, near the rim flanges, with a hammer. If this fails also, he will probably try driving a tire tool or the like between the bead and the rim flange. Such procedures are not only arduous and time-consuming but are often injurious to the tire.

It is the principal object of this invention to provide a novel device whereby the beads may be quickly and easily broken loose from the rim with no danger of damage to the tire.

Another object is to provide a bead loosening device quickly and easily adjustable for use on tires of various sizes.

A further object of the invention is to provide a hand-operated device in which the necessary force is produced by a nut threaded upon a standard, said nut having an operating handle.

A still further object of the invention is to provide a ratchet connection between the nut and handle for convenience of operation.

Yet another object of the invention is to provide a simple device which may be sold at a reasonable price, yet will give years of service at any service station or garage.

With the above and other objects in view that will become apparent as the nature of the invention is better understood, the same consists in the novel form, combination and arrangement of parts hereinafter more fully described, shown in the accompanying drawings, and claimed.

In the drawings:

Fig. 1 is a side elevation of the invention,

Fig. 2 is a top plan view, and

Fig. 3 is a vertical sectional view on line 3—3 of Fig. 2, showing the device in use.

A base 5 is provided to be bolted or otherwise secured to a floor or to a work-bench or the like. This base is provided with a horizontal wheel support 6. The base 5 may well have a cylindrical socket 7 rotatably receiving a downwardly projecting stub 8 on the wheel support 6 but said base and support could well be integral with each other. These two elements are formed with alined vertical bores 9 and 10 through which the lower portion of a vertical bolt or standard 11 extends, said bolt or standard being so connected with the base 5 that it cannot rotate and cannot move upwardly with respect to said base. For this purpose, a square head 12 has been shown on the bolt or standard 11, and a square socket 13 has been provided in the base 5, said socket receiving said head.

Above the wheel support 6, there is a spider 14, said spider comprising a hub 15, and arms 16 radiating from said hub. The hub 15 is formed with a vertical bore 17 loosely receiving the upper portion of the bolt or standard 11, and a supporting spring 18 is provided for said hub. This spring rests upon the wheel support 6 and loosely surrounds the bolt or standard 11. A nut 19 rests upon the hub 15 and engages a screw thread 20 on the bolt or standard 11, whereby tightening of this nut will depress the entire spider 14 and loosening of said nut will allow the spring 18 to raise said spider.

The nut 19 is provided with a base flange 21 and with peripheral teeth 22 above said flange. The head 23 of a ratchet handle 24 surrounds the nut 19 and rests on the flange 21, and the spring-pressed ratchet or pawl 25 of said head engages the teeth 22 for operating the nut 19. The ratchet handle is used in the position shown for tightening the nut and is used in an inverted position for loosening said nut.

Each of spider arms 16 is formed with a longitudinal slot 26 which opens through its upper and lower sides, the lower side of each arm is provided with transverse grooves 27, and the upper side of each arm is provided with similar grooves 28.

Vertical thrust members 29 are provided to transmit downward thrust from the spider 14 to the tire 30 of a wheel 31 to break the tire beads 32 loose from the wheel rim 33. Each thrust member 29 comprises a vertical shank 34 having a presser-foot 35 at its lower end, said presser-foot being preferably of the fishtail form shown most clearly in Fig. 1. The shank 34 is provided with lateral upwardly facing shoulders 36 and with a cross-pin 37 above said shoulders. The shanks 34 extend through the slots 26 of the spider arms 16, and the cross-pin 37 may seat in any of the grooves 28 to normally suspend the thrust members 29 from the spider 14 as seen in Fig. 1. When a tire is being loosened, however, the shoulders 36 are seated in the proper sets of grooves 27, according to the size of the tire, as will be clear from Fig. 3.

In using the device, the spider 14 and the thrust devices 29 are removed as a unit, after removing the nut 19. The wheel 31 is then laid upon the support 16 and approximately centered. The spider 14 and thrust members 29 are then replaced and supported by the spring 18, and the nut 19 is reapplied. The thrust members 29 are now adjusted along the slots 26 until they will hang (with the cross-pins 31 in the grooves 28) in such position that the lower ends of the presser-feet 35 will be as near as possible to their proper positions. Then, the spider 14 is depressed by means of the nut 19 until the shoulders 36 engage certain of the grooves 27. At this stage, the lower ends of the presser-feet 35 are properly placed against the edge of the rim flange as seen in Fig. 3. The nut 19 is then forcibly turned down by means of the ratchet handle 24, causing the upper bead 32 to break loose from the rim. Should the bead break loose only under the feet 35 and not between them, it will of course be necessary to loosen the nut 19, turn the wheel somewhat and repeat the operation. After loosening the uppermost bead, the wheel may be inverted and the device then operated to similarly break the other bead loose.

From the above detailed description of the invention, it is believed that the construction, use, and operation thereof will at once be apparent, and while there is herein shown and described the preferred embodiment of the invention, it is nevertheless to be understood that minor changes may be made therein without departing from the spirit and scope of the invention as claimed.

I claim:

1. A tire bead loosener including a base, a standard projecting upwardly from the center of the base and non-rotatably connected thereto, a rotary wheel center support mounted on said standard and resting on said base, a spider having a hub slidably mounted on the standard in spaced relation to the said support, a nut threaded on the upper end of said standard, a coiled compression spring surrounding the standard between and seated against said support and hub and holding said hub yieldably against said nut, spider arms radiating from said hub, and thrust members supported by and extending downwardly from said arms.

2. A tire bead loosener including a base, a standard projecting upwardly from the center of the base and non-rotatably connected thereto, a rotary wheel center support mounted on said standard and resting on said base, a spider having a hub slidably mounted on the standard in spaced relation to the said support, a nut threaded on the upper end of said standard, a coiled compression spring surrounding the standard between and seated against said support and hub and holding said hub yieldably against said nut, spider arms extending radially from said hub, said arms being each taperingly decreased in vertical dimension from the hub outwardly, said arms having longitudinal slots extending vertically therethrough and spaced notches in their upper and lower faces, and thrust members having shanks extending through said slots and provided with notch-engaging means below and above the arms.

FRANK A. MORGAN.

References Cited in the file of this patent

UNITED STATES PATENTS

| Number | Name | Date |
|---|---|---|
| 582,013 | Ellebrecht | May 4, 1897 |
| 1,489,151 | Prossen | Apr. 1, 1924 |
| 2,024,891 | Spuler et al. | Dec. 17, 1935 |
| 2,464,638 | Falkner | Mar. 15, 1949 |
| 2,495,118 | McCollister | Jan. 17, 1950 |
| 2,545,157 | McCrary | Mar. 13, 1951 |